US007011758B2

(12) United States Patent
Rajagopalan et al.

(10) Patent No.: US 7,011,758 B2
(45) Date of Patent: Mar. 14, 2006

(54) METHODS AND SYSTEMS FOR MEMBRANE TESTING

(75) Inventors: Nandakishore Rajagopalan, Champaign, IL (US); Todd N. Rusk, Champaign, IL (US); Robert A. Sanford, Champaign, IL (US)

(73) Assignee: The Board of Trustees of the University of Illinois, Urbana, IL (US)

( * ) Notice: Subject to any disclaimer, the term of this patent is extended or adjusted under 35 U.S.C. 154(b) by 176 days.

(21) Appl. No.: 10/364,244

(22) Filed: Feb. 11, 2003

(65) Prior Publication Data

US 2003/0168408 A1 Sep. 11, 2003

Related U.S. Application Data

(60) Provisional application No. 60/355,902, filed on Feb. 11, 2002.

(51) Int. Cl.
*B01D 35/06* (2006.01)
*B01D 61/00* (2006.01)

(52) U.S. Cl. ...................... 210/650; 210/695; 210/739; 210/806; 73/38

(58) Field of Classification Search .................. 210/85, 210/96.1, 223, 650, 695, 739, 806; 73/38
See application file for complete search history.

(56) References Cited

U.S. PATENT DOCUMENTS 4,454,234 A 6/1984 Czerlinski
4,954,002 A 9/1990 Wallis et al.
5,053,344 A 10/1991 Zborowski et al.
5,282,380 A 2/1994 DiLeo et al.
5,477,155 A 12/1995 Proux et al.
5,581,017 A 12/1996 Bejtlich, III
5,714,059 A 2/1998 Seifert et al.
5,980,479 A * 11/1999 Kutushov .................. 436/806
6,077,332 A * 6/2000 Barnes ....................... 210/695
6,386,053 B1 5/2002 Takeuchi et al.
6,451,207 B1 9/2002 Sterman et al.
6,743,365 B1 * 6/2004 Marlowe .................... 210/695

OTHER PUBLICATIONS

"Assessing the reliability of low pressure membrane systems for microbial removal," Adham, et al., Crit Issues Water Wastewater Treat., Proc.Natl.Conf.Environ.Eng., 313-319 American Society of Civil Engineers (1994).
"Monitoring of reverse osmosis for virus rejection," Adham, et al., Proc.-Water Qual. Technol. Conf., 601-611 (1998).
"The Water Supply (Water Quality) (Amendment) Regulations 1999: Cryptosporidium in Water Suppliers," Drinking Water Inspectorate: Information Letter, http://www.dwi.gov.uk/regs/infolett/1999/info1699.html.
"Predicting log removal performance of membrane systems using in-situ integrity testing," proceedings Annual Conference AWWA, 411-419 (1997).
"The construction and commissioning of a 24 MGD ultrafiltration plant with on-line integrity testing to monitor and maintain the barrier to cryptoporidium sized particles," AWWA Conference (Mar. 2001).
"Development of an innovative method to monitor the integrity of a membrane water repurification system," Gagliardo et al., Metropolitan Wastewater Department, Montgomery Watson, School of Public Health, pp. 1-33. (1999).

(Continued)

*Primary Examiner*—David A. Reifshnyder
(74) *Attorney, Agent, or Firm*—Greer, Burns & Crain, Ltd.

(57) ABSTRACT

A method for testing the integrity of a membrane includes steps of placing a magnetically susceptible material in a fluid upstream of the membrane, collecting the material downstream of the membrane using a magnetic field, and detecting the material using a sensor.

42 Claims, 3 Drawing Sheets

OTHER PUBLICATIONS

"Magnetic Bioseparations," Chapter 13,Garcia et al., Bioseparation Process Science, Blackwell Science, Inc. MA, 299-314 (1999).

"A high-Sensitivity Micromachined Biosensor." Baselt et al., Proceedings of the IEEE, vol. 85, #4, 672-681 (Apr. 1997).

"Mass Culture of Magnetic Bacteria and Their Application to Flow Type Immunoassays", Matsunaga et al., IEEE Transactions on Magnetics, vol. 26, #5, 1557-1559, (Sep. 1990).

"Continuous Cultivation and Recovery of Magnetotactic Bacteria," Bahaj et al., IEEE Transactions on Magnetics, vol. 33, #5, 4263-265 (Sep. 1997).

"Rapid Selective Ferrographic Enumeration of Bacteria," Zhang et al., Journal of Magnetism and Magnetic Materials 194 (1999), 267-274.

"Improvement of the Immunomagnetic Separation Method Selective for E. Coli O157 Strains," Tooyasu, Applied and Environmental Microbiology, 376-382 (Jan. 1998).

"Magnetic Separation of Nanoparticles," Kelland IEEE Trans. on Magnetics, vol. 34, No. 4, 2123-2125 (Jul. 1998).

"A Biosensor Based on Magnetoresistance Technology," Baselt et al., Biosensors & Bioelectronics, 13, 731-739 (1998).

"Magnetic Resonance Imaging of the Filtration Process," Dirckx et al., AIChE Journal, vol. 46., #1, 6-14, (Jan. 2000).

"A Magnetic Sensor for Predicting Seafloor Oxygen Depletion," Solan et al., J. Marine. Environ. Eng., vol. 5m pp. 239-255 (1999).

"Advances in the Preparation of Magnetic Nanoparticles by the Microemulsion of Method," Lopez et al., The Journal of Physical Chemistry B, vol. 101, No. 41, 8046-8047 (Oct. 9, 1997).

"Membrane Integrity Monitoring at the UF/RO Heemskerk Plant," Kruithof et al., AWWA., Membrane Conference Proceedings, 1-9, (2001).

"High Gradient Magnetic Separation of Motile and Non-Motile Magnetotactic Bacteria," Bahaj et al., IEEE Transactions on Magnetics, vol. 32, No. 5, 5106, 5108, (Sep. 1996).

"Comparing Laser Turbidimetry with Conventional Methods for Monitoring MF and UF Membrane Integrity," Colvin et al., AWWA Membrane Conference Proceedings, B-1-B-18, (2001).

"Integrity of membrane elements, vessels and systems." Nederlof, et al., Desalination , 113, 179-181 (1997).

"Automatic monitoring of membrane integrity in microfiltration systems," Johnson, Desalination 113, 303-307 (1997).

"Preparation and Characterization of Magnetically Active Polymeric Particles (MAPPs) for Complex Environmental Separations," Leun et al., Environ. Science and Technology, 34, 3276-3282 (2000).

"Field Evaluation of Ceramic Microfiltration Membranes in Drinking Water Treatment," Rajagopalan, et al. AWWA Membrane Technology Conference Proceedings, 1-22 (2001).

"Ultra- and microfiltration pilot plant investigations to treat reservoir water," Desalination 119, 277-288 (1998).

"Low pressure membranes: assessing integrity," Adham et al., Journal AWWA, 62-75 (Mar. 1995).

"Monitoring the integrity of capillar membranes by particle counters," Panglisch et al., Desalination 119, 65-72 (1998).

"Feasibility Study on Separation of Several Tens Nanometer Scale Particles by Magnetic Field-Flow-Fractionation Technique Using Superconducting Magnet," Tsukamoto et al., IEEE Transactions on Applied Superconductivity, vol. 5, No. 2, 311-314 (Jun. 1995).

"Development of a new on-line membrane integrity testing system." van Hoof et al., American Water Works Association, Membrane Conference Proceedings, pp. 1-11, 2001.

* cited by examiner

METHODS AND SYSTEMS FOR MEMBRANE TESTING

CROSS REFERENCE

The present application claims the benefit of U.S. Provisional Patent Application No. 60/355,902 filed on Feb. 11, 2002.

FIELD OF THE INVENTION

The present invention is related to testing the integrity of membranes.

BACKGROUND OF THE INVENTION

Semi-permeable membranes are often used in separation applications to selectively allow passage of a purified material such as a fluid. For example, water filtration applications may use a filter to remove contaminants such as inorganic and organic particulate, bacteria, colloidal macromolecules, viruses, dissolved salts, and the like. Membrane technologies such as microfiltration, ultrafiltration, nanofiltration, and reverse osmosis, among others, may be used. These particular applications have seen tremendous growth in the United States in the recent past due to recent amendments to the Safe Water Drinking Act in 1996.

Because the primary role of the membrane is to act as a barrier to contaminants, it is essential that the integrity of the barrier be evaluated on a regular basis. Some methods and systems for evaluating membrane integrity are generally known. For example, it is known to apply a pressure differential across the membrane and measuring the time decay of the differential. The pressure differential may be applied using air, an inert gas, or vacuum, for example. These methods, however, require costly pressure tight enclosures, as well as systems for applying the elevated pressure or vacuum. Also, a continuous flow process using a membrane may have to be taken off line to perform testing.

Other methods for evaluating a membrane require regular testing of filtered fluid quality. When contaminants are discovered, the membrane is changed. Testing of the filtered fluid can be time consuming, costly, and may be limited in accuracy, however. For example, one system uses light scattering particle counters to detect the presence of contaminant particles, while other systems use electrical current/resistance measuring detectors or turbidity monitors. These systems and methods suffer a relatively low signal to noise ratio, and are generally limited by reasons of cost to detection of particles measuring >2 microns. Also, they are susceptible to false readings due to the presence of air bubbles, and are generally not suitable for detecting viruses.

Similar problems are associated with other known testing systems and methods, with the result that many problems remain unresolved in the art.

SUMMARY OF THE INVENTION

Embodiments of the present invention are directed to methods and systems for testing membrane integrity. An exemplary method includes the steps of adding a magnetically susceptible material to a fluid upstream of a membrane, and applying a magnetic field to collect any of the material that has passed through the membrane. Exemplary magnetically susceptible materials of the invention include metallic particles as well as micro organisms.

DETAILED DESCRIPTION

Figure 1:
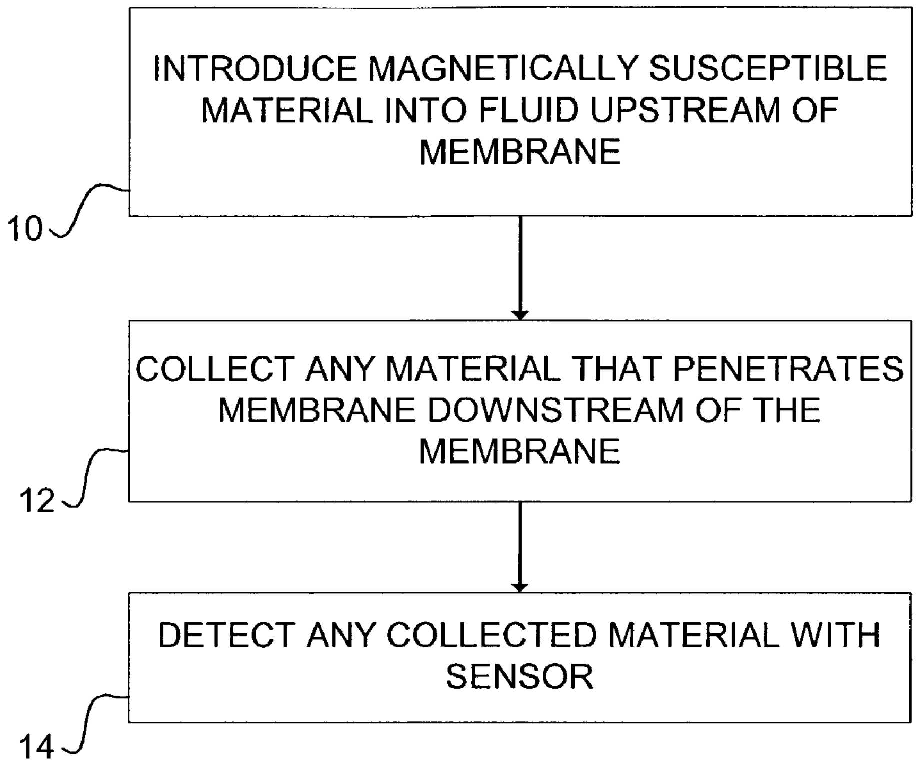
FIG. 1 is a flowchart of an exemplary method of the invention.

Turning now to the drawings, FIG. 1 is a flowchart illustrating steps of an exemplary method of the invention useful for testing of a membrane such as a filter in a fluid. A magnetically susceptible material is placed in the fluid at a location upstream of a membrane (block 10). At a location downstream of the membrane, a magnetic collector is used to collect any of the material that has penetrated the membrane (block 12). The collector delivers the collected magnetically susceptible material to a sensor, which then detects its presence (block 14).

Figure 2:
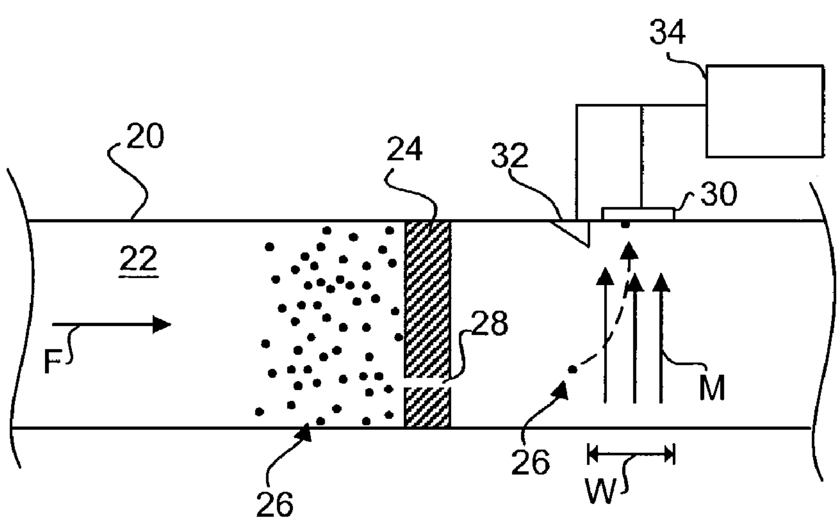
FIG. 2 is a schematic cross section of an exemplary system of the invention.

This exemplary method may be further illustrated through consideration of FIG. 2 showing an exemplary system of the invention. A container 20 such as a pipe contains a fluid 22 that is flowing in the direction of the arrow F through a membrane 24. It will be appreciated that other directions of flow may also be present, with an example being a cross flow across the face of the membrane 24 to reduce surface caking. A magnetically susceptible material shown generally at 26 in the form of a plurality of discrete objects is deposited upstream of the membrane 24. As used herein the term "magnetically susceptible" is intended to be broadly interpreted as capable of being attracted to a magnet. A magnetically susceptible material may also be capable of having a magnetic field induced therein. A defect 28 in the membrane 24 allows some of the material 26 to pass through. A magnetic field is applied by a magnetic collector 30 in the direction of the arrows M downstream of the membrane 24 to collect the penetrating material 26 and deliver it along a path generally illustrated by the dashed arrow for detection by the sensor 32. As used herein, the term "sensor" is intended to be broadly interpreted as a device for detecting the presence of material. The sensor 32 and the magnetic collector 30 may be controlled by a controller 34 such as a computer.

The container 20 may be a pipe, channel, trough, or the like useful to hold fluid. Preferably it is made of a non-metal material so as to not interact with the magnetic fields of the material 26 or the collector 30. One exemplary container 20 is piping made of polymer, such as polyvinyl chloride (PVC). Such piping offers advantages including low cost and ease of configuration.

The magnetically susceptible material such as the particles 26 used in methods and systems of the invention may be selected on the basis of such design considerations as cost, availability, fluid compatibility, and the like. The magnetically susceptible material is preferably of a size selected with reference to the membrane being tested. For example, membranes may have a specified passage parameter such as a pore size above which no particles should penetrate. By way of particular example, a semi-permeable membrane may be designed to prevent passage of particles larger than 5 microns. To test the integrity of this membrane, a multiplicity of magnetically susceptible particles of a size range of between about 5 and about 10 microns could be used. Passage and detection of any of these particles would thus indicate a defect in the membrane.

Examples of magnetically susceptible materials 26 which may be useful for practice of the invention include but are not limited to one or more of the transition metal oxides, sulfides, silicides and carbides. Further examples include classes of materials referred to as ferrites such as $MO.Fe_2O_3$ in which M may be Zn, Gd, V. Fe, In, Cu, Co, or Mg. A class of magnetic metal oxide without iron can also be used, including for example oxides of combinations of two or more of the following metal ions: Al(+3), Ti(+4), V(+3), Mn(+2), CO(+2), Ni(+2), Mo(+5), Pd(+3), Ag(+1), Cd(+2), Gd(+3), Tb(+3), Dy(+3), Er(+3), Tin(+3), and Hg(+1). In addition to purely metallic materials, metallic compounds may be used. Also, small amounts of a metal may be embedded or otherwise combined with a polymer or other material. Finally, systems and methods of the present invention may be practiced using magnetically susceptible materials 26 that are microorganisms including, but not limited to, bacteria, viruses, and other pathogens such as Giardia and Cryptosporidium.

The magnetically susceptible material 26 may also be made magnetic before being placed in the fluid 22. As used herein, the term "magnetic material" is intended to broadly refer to magnetically susceptible material in which magnetism has been induced. Use of magnetic material may allow for a smaller or weaker magnetic collector 30 to be used to collect the material 26 downstream. Methods are known for inducing magnetism in these particles. For example, exposing magnetically susceptible particles to an external magnetic field is known to induce magnetism in the particles. Discussions on the physics of inducing magnetism may be found, for instance, in "Bioseparation Process," Chapter 13, by A. A. Garcia et al., Bioseparation Process Science, Blackwell Science, Inc. MA (1999), incorporated herein by reference. Exemplary embodiments of the invention may include a step of inducing a magnetic moment in the magnetically susceptible material prior to addition to the fluid 22.

Particular size ranges for use in practice of the invention will depend on the membrane to be tested. An exemplary size range believed to be useful with many embodiments of methods and systems of the invention is between about 0.1 and about 20 microns, and are preferably between about 5 and about 20 micron suitable for many applications. An exemplary size range appropriate to model viruses is between about 0.01 and about 0.1 micron, an exemplary size range for modeling bacteria between about 0.1 and about 5 microns, and an exemplary size range of between about 1 and about 20 micron suitable for modeling microorganisms such as Cryptosporidia and Giardia. When considering the exemplary sizes referred to herein above with regards to microorganisms, it will be appreciated that the microorganisms may not be spherical in shape. The exemplary sizes referred to herein should be broadly interpreted to apply to the dominant or largest dimension of a microorganism when it is not spherical in shape.

Other size ranges than these exemplary ranges will also be useful, with an ultimate practical minimum size limitation believed to depend on the ability to collect and detect the material. It is believed that current magnetic collectors 30 and sensors 32 practical for use with the invention are capable of collecting and detecting materials down to a size range of about 0.01 micron and smaller.

Magnetically susceptible particles may be classified as being paramagnetic, ferromagnetic, ferrimagnetic, or superparamagnetic, depending on the strength and interaction with the applied magnetic field. Generally, superparamagnetic particles having high magnetic susceptibility and a low density are preferred for the present invention, although other particles will be useful. High magnetic susceptibilities provide for higher magnetization and are desirable because they require a lower magnetic field for collection. By way of preferred example, particles have a magnetic mass susceptibility of at least about $75\times10^{-6}$ $m^3/kg$ (SI units), and more preferably of at least about $125\times10^{-6}$ $m^3/kg$ (SI units). Lower densities are generally preferred for their flow characteristics since higher density particles may tend to settle out of low flow rate applications. For example, in water based applications, densities close to that of water are desirable, with a particular preferred density being less than about 2 $gm/cm^3$. At sizes below about 1 micron a particle's tendency to settle out diminishes, and density becomes less of a concern.

Also, it may be advantageous to select materials having a charge behavior similar to the charge behavior of contaminants of interest. That is, if the integrity of a membrane is desired to be tested with a particular contaminant in mind, a magnetically susceptible material with a similar charge behavior, with an example being a metal particle or a bacteria, may be selected to provide consistent membrane penetration characteristics.

Commercial supply sources are available for the magnetically susceptible materials, including metallic particles, in the exemplary size ranges. Some commercially available examples are described in "A high-sensitivity micromachined biosensor," Proceedings of the IEEE, Vol. 85, #4, by Baselt, D. R., Lee, G. U., Hansen, K. M., Chrisey, L. A., and Colton, R. J., (April 1997); herein incorporated by reference. These examples include:

TABLE 1

| Type | Diameter $\mu m$ | Density $G/cm^3$ | Magnetization $emu/cm^3$ |
|---|---|---|---|
| Dynabeads M-280 | 2.8 ± 0.2 | 1.34 | 14.8 |
| BioMag 8-4100B | Nonspherical | 2.5 | 273.2 |
| Estapor 66% | 0.35 $\mu m$ ± 0.15 | 2.24 | 116.2 |

Other commercially available particles useful for practice of the invention include include Miltenyi Biotec, Auburn Calif., USA; and Bangs Laboratories, Fishers, Ind., USA.

In many applications use of a magnetically susceptible or a magnetic bacteria or other microorganism may be favored over a metallic or other material. For example, use of a bacteria or other microorganism that is native to the water may offer advantages related to accuracy of flow and membrane penetration modeling. The microorganism may more effectively model membrane-penetrating behavior of a bacteria contaminant than would a metal particle. A metal particle, for instance, may have fundamentally different surface characteristics and charge behavior than the bacteria, and thus may interact with the membrane differently. Its ability to penetrate the membrane may thus be appreciably different than the bacteria. Accordingly, selection of particular bacteria, virus, or other microorganisms for practice the invention may be made to closely match the microorganism that the subject membrane is intended to filter.

Those skilled in the art will appreciate that methods for making a bacteria magnetically susceptible and for inducing magnetism in the bacteria, viruses, or other microorganisms are known. Examples of these methods include the cultivation of naturally magnetotactic bacteria as taught in "Mass culture of magnetic bacteria and their application to flow type immunoassays", IEEE Transactions on Magnetics, Vol 26, #5, pp. 1557–1559, by Matsunaga, T.; Tadokoro, F.; Nakamura, N. (Dep. Biotechnol., Tokyo Univ. Agric. Technol., Koganei, Japan (September 1990); ("the Matsunaga reference"), and "Continuous Cultivation and Recovery of Magnetotactic Bacteria," IEEE Transactions on Magnetics, Vol 33, #5, pp. 4263–265; by A. S. Bahaj, P. A. B. James, and F. D. Moeschler, (1997); both of which are herein incorporated by reference Methods for attaching a magnetically susceptible material such as a metallic particle to a microorganism such as bacteria are likewise known. For instance, a magnetic metallic particle may be coated with an antibody that binds to an antigen on the bacteria. An example of such a method is disclosed in detail in "The Journal of Magnetism and Magnetic Materials," Rapid Selective Ferrographic Enumeration of Bacteria 194, pp. 267–274, by P. Zhang, W. P. Johnson, (1999) ("the Zhang reference"), herein incorporated by reference. In other exemplary methods, nonspecific adsorption of bacteria to magnetic beads has been accomplished where the beads are exposed to a concentrated solution of bacterial culture. An example of this type of method is set out in detail in "Improvement of the Immunomagnetic Separation Method Selective for *E. Coli* O157 Strains," by T. Tooyasu, Applied and Environmental Microbiology, pp. 376–382, (January 1998), herein incorporated by reference.

Referring once again to FIG. 2, the magnetic collector 30 applies the magnetic field M at a location downstream of the membrane 24 to collect the material 26 that has penetrated the membrane 24. A sensor 32 detects the collected material. The steps of applying the magnetic field M in combination with using the sensor 30 to detect the material 26 has been discovered to provide a number of valuable advantages. Applying the magnetic field M to collect the magnetically susceptible or magnetic material 26 can be thought of as concentrating the material 26 for detection. Very low pre-collection concentrations of the material 26 can be "amplified" through magnetic collection and conveyed to the sensor 30 in this much higher concentration. Cost savings are thus realized because magnetic collection allows for smaller, less powerful sensors to be used. Also, very low overall pre-collection concentrations of the material 26 may be detected.

The magnetic collector 30 may be a permanent magnet or an electromagnet, and may be separate from the sensor 32, as has been illustrated in FIG. 2, or it may be integral therewith. In one exemplary embodiment, the magnetic collector 30 is an electro magnet that is placed on the exterior of the pipe 20. The collection efficiency of the magnetic collector 30 is dependent on design factors including the strength of the applied magnetic field M, the field gradient, the residence time of the material in the magnetic field M, the magnetic moment of the material 26 to be captured, the inertia of the of the material 26 induced by fluid flow, the distance to the collector 30, and the geometry of the "collection zone." The term "collection zone" as used herein is intended to broadly refer to the region in which material 26 is to be magnetically collected. Referring to the schematic of FIG. 2 by way of example, the collection zone is generally the region in the pipe 20 where the arrows M show a magnetic force to be concentrated. The collection zone of FIG. 2 has the length shown as W, and preferably extends across an entire cross section of the fluid passing through the container 20 (e.g., across the diameter of a pipe 20) to minimize the chance that any material 26 will escape collection.

It will be appreciated that different applications will require different magnetic collector 30 strengths and different collector zone geometries. Enhancement of the field strength can be achieved by narrowing a channel that the collection zone exists in. Doing so, however, may increase fluid flow rate and thereby decrease residence time in the collection zone. Those skilled in the art will appreciate that some experimentation may be required to determine an optimum configuration. By way of example only, it is believed that paramagnetic particles of about 500 nm in diameter can be captured using a magnetic field of about 7 Tesla strength in a collection zone of about 10 micron in length when the particles have a residence time of at least about 1 sec in the zone. Particles of much smaller diameter (< about 0.1 micron) can be captured by choosing particles with higher magnetic susceptibility. For example, it is believed that for a 30 nm particle of magnetic volume susceptibility of about 0.1 can be captured applying a magnetic field of about 2 Tesla to create an appropriate field gradient. Increasing the residence time in the collection zone by either lowering the flow rate or increasing the width W of the collection zone will substantially lower the required field strengths for capture. As a general consideration, a residence time of at least about 1 sec. in the collection zone and an applied magnetic field gradient of at between about 10 Tesla/m and about 20,000 Tesla/m preferred. The gradient will depend on factors such as the size of the particle, the geometry of the collection zone, and the like. An additional exemplary gradient range is between about 5,000 and about 20,000 Tesla/m.

Figure 3:
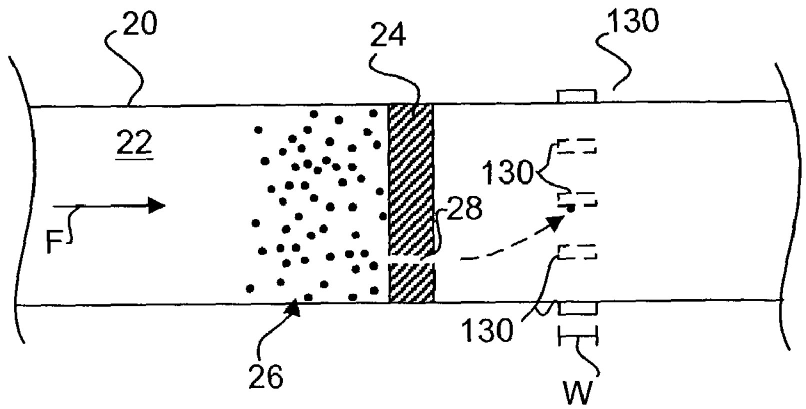
FIG. 3 is a schematic cross section of an exemplary system of the invention.

FIG. 3 illustrates an alternate configuration for practice of systems and methods of the invention. Elements consistent with those of FIG. 2 have been labeled with the same element numbers as were used in FIG. 2. In the configuration of FIG. 3, a plurality of magnetic collectors 130 has been arranged about the pipe 20. The collectors 130 as illustrated are distributed about the perimeter of the exterior of the pipe 20, with collectors 130 on the rear side of the pipe 20 shown in dashed in FIG. 3. This results in magnetic particles 26 being drawn towards the wall of the pipe 20 for sensing. The configuration of FIG. 3 also contemplates sensors 130 that are integral with the magnetic collectors 130. One or more sensors separate from the collectors 130 could also be used. For example, one or more sensors 32 of FIG. 2 could be placed proximate to the pipe 20 wall. As illustrated the plurality of collectors 130 establish an equal plurality of individual collector zones. It will be appreciated that other configurations could be practiced that would result in a plurality of collectors 130 combining to create a single applied magnetic field and collection zone.

Configurations similar to that of FIG. 3 could also be practiced with the plurality of collectors 130 arranged across the interior width or cross section of the pipe 20. For example, the plurality of collectors 130 could be arranged in a matrix across the interior width of the pipe 20. One example of such an arrangement is disclosed in U.S. Pat. No. 6,451,207, incorporated herein by reference. Such a configuration could result in a plurality of individual collection zones that were relatively small in size. The gradient of the applied magnetic fields in each of the individual collection zones could be higher than that of the field M of FIG. 2 because of interaction effects and the shorter distance that the fields are applied over.

Figure 4:
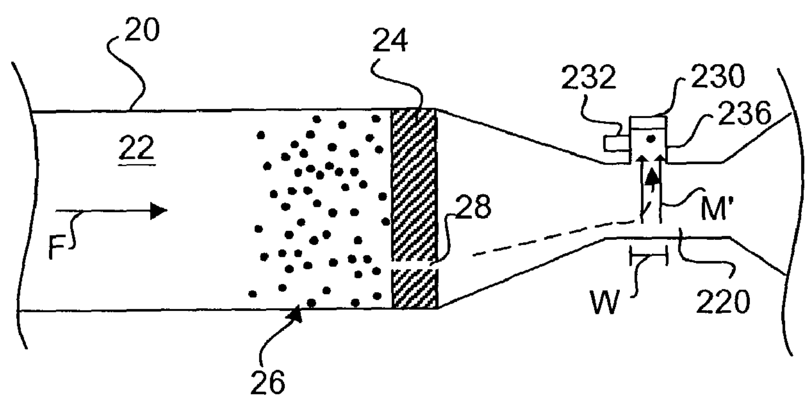
FIG. 4 is a schematic cross section of an exemplary system of the invention.

FIG. 4 illustrates another exemplary configuration for practice of methods and systems of the invention. In this configuration, the membrane 24 is held in a first channel defined by the pipe 20, and the magnetic field M' is applied across a second channel 220 that is smaller than the first. This allows for a smaller magnetic field M' to be used, as compared to the field M of FIG. 2 for instance, since it must be applied across a shorter width. It will be appreciated that the flow rate will increase through the narrower second channel 220, which must be considered in terms of the residence time of the fluid in the collection zone.

FIG. 4 also illustrates a magnetic collector 230 that has been arranged adjacent to a sensing channel 236. The sensing channel 236 has been illustrated as a separate volumetric space connected to the pipe 20. It may also be a channel interior to the pipe 20, or may be a channel that connects a separate container to the pipe 20. A sensor 232 is operative to detect the material 26 as it passes through the sensing passage 236. An additional example of a configuration utilizing a sensing passage is contained in "Magnetic Separation of Nanoparticles," IEEE Transactions on Magnetics, Vol 34, No. 4, pp. 2123–2125, By D. Kelland (1998), herein incorporated by reference.

Figure 5:
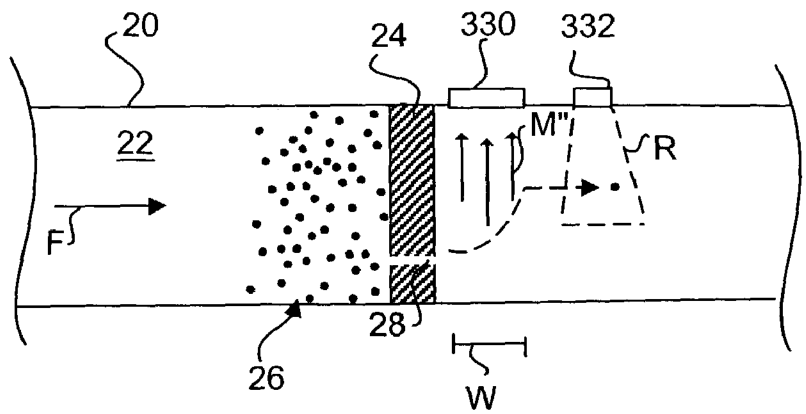
FIG. 5 is a schematic cross section of an exemplary system of the invention.

FIG. 5 illustrates an additional invention embodiment in which the magnetic collector 330 collects the particle 26 for delivery to a sensing channel in the pipe that flows through the sensing region R of the sensor 332. As illustrated, the sensing region R is not separated by any structure from the remainder of the pipe 20 interior. Savings are realized in that the region R need not extend across the whole of the pipe 20 due to the concentrating effect of the magnetic collector 330.

In accordance with the configuration of FIG. 5, it will be understood that "collect" as used herein is intended to be broadly interpreted. For instance, particles 26 that have their path affected and are thereby directed or diverted along a path through action of the magnetic collector 330 may be considered to be "collected." Accordingly, as used herein "collect" does not necessarily require physically retaining a particle 26, although particles 26 that are attracted to a magnetic collector and retained thereon may also be "collected." The configuration of FIG. 2, for example, contemplates a collection of the material 26 that will result in the material 26 being retained by the collector 230 for subsequent removal.

Figure 6:
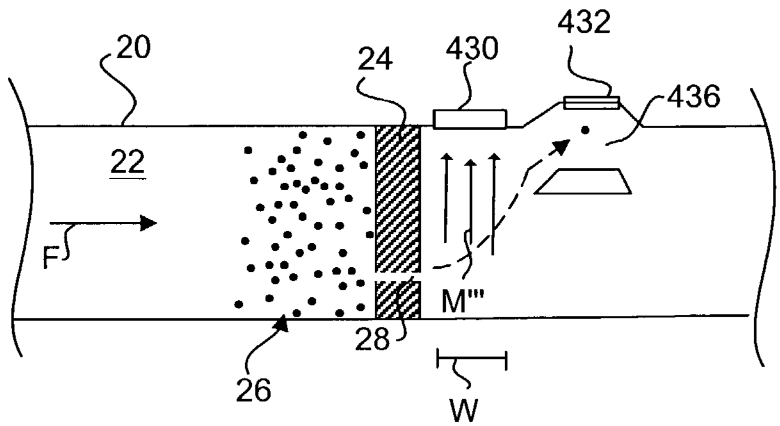
FIG. 6 is a schematic cross section of an exemplary system of the invention.

A variation of the configuration of FIG. 5 is presented in FIG. 6. The magnetic collector 430 collects any of the particles 26 that have penetrated the membrane 24 and diverts them into the sensing channel 436 for detection by the sensor 432. Because of the concentrating effect of the collector 430, a relatively small portion of the total fluid flowing through the membrane 24 is subjected to sensing by the sensor 432.

Figure 7:
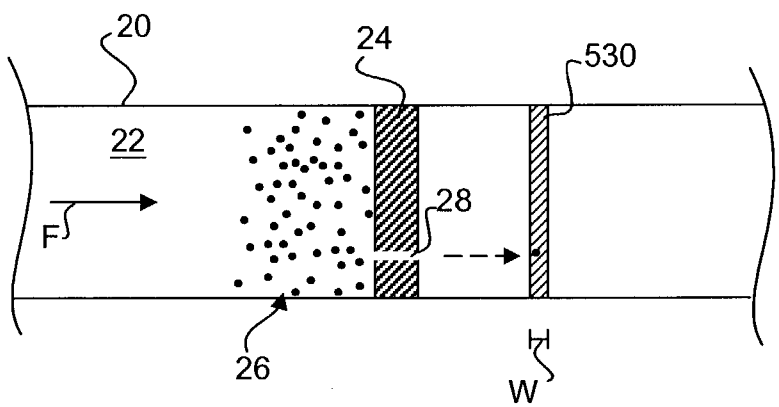
FIG. 7 is a schematic cross section of an exemplary system of the invention.

FIG. 7 illustrates still another exemplary invention configuration. In this embodiment, a magnetic collector 530 extends across the pipe 20. The collector 530 may be a coarse magnetic filter, for example, that is made of a plurality of packed soft magnetic spheres, a web of magnetic wires or fibers, or the like. Depending on its width and coarseness, the collector 530 may only need to apply a relatively weak magnetic field to collect the material 26 via inertial capture as the fluid 22 flows through the collector 530. Use of a collector such as the magnetic filter 530 may require detection off line. That is, detection of the material 26 captured by the magnetic collector 530 may require that the collector 530 be removed from the pipe 20 for inspection by a sensor. On-line use is also contemplated, however, with for instance a sensor integral with the collector 530.

On-line practice of the invention is generally preferred, in fact. As used herein, the term "on-line" is intended to broadly refer to during continuous flow, as opposed to requiring a stoppage of flow to remove fluid, a collector, or the like (i.e., "off-line"). Several sensors are appropriate for on-line use. These include those that rely on the magnetic property of the magnetically susceptible or magnetic material 26 for sensing and those that rely on other properties. An example of the former is a magnetic field sensor that detects magnetic material through detection of its field. Sensors of this general type include so-called low field sensors (capable of measuring <1 micro gauss), earth field sensors (1 micro gauss to 10 gauss), and bias field sensors (>10 micro gauss). Any of these types of sensors may be useful for practice of the invention, with one favored over the others based on consideration of the magnetic field of the material to be detected.

A preferred example of a sensor is a giant magnetoresistance ("GMR") sensor. An example is illustrated in detail in, "A Biosensor Based on Magnetoresistance Technology," by D. R. Baselt, G. U. Lee, M. Natesan, S. W. Metzger, P. E. Sheehan, and R. J. Colton, Biosensors and Bioelectronics, 13, 731–739 (1998), incorporated herein by reference. Other sensors based on the magnetic properties of the material include magnetic relaxation sensors (e.g., magnetorelaxometery), magnetic resonance imaging ("MRI") sensors, and nuclear magnetic resonance ("NMR") sensors. An example of an MRI sensor is illustrated in, "Magnetic Resonance Imaging of the Filtration Process," by C. J. Dirckx, S. A. Clark, L. D. Hall, B. Antalek, J. Toona, J. Michael Hewitt, and K. Kawaoka, AIChE Journal, Vol. 46., #1, pp. 6–14, (January 2000), herein incorporated by reference.

Sensors that are not dependent on the magnetic properties of the collected material may also be useful either on-line or off-line. For example, visual identification of particles is possible for larger particles. A simple version of such a sensor is an optical microscope for particles larger than 1 micron. Light scattering sensors may likewise be useful in some applications. For smaller particles, surface-profiling sensors may be used that are capable of detecting the presence of very small particles on their surface. For smaller particle sizes, interference microscopy can be used to provide resolution in nanometers in the vertical direction. Laser scanning sensors may likewise be useful, with sensitivity believed to be accurate to determine the presence of particles on surfaces in concentrations as low as 1 cell/ml. An example of such a sensor is reported in "Rapid Selective Ferrographic Enumeration of Bacteria," Journal of Magnetism and Magnetic Materials, 194, pp. 267–274, by P. Zhang, W. P. Johnson, (1999), herein incorporated by reference.

Still other sensors useful with practice of the invention operate by detecting changes in mass. A piezoelectric sensor is one particular example of this type of sensor. In a piezoelectric sensor the frequency of vibration of the sensor is changed by the increase in mass. Appropriate circuitry detects the frequency change. An example of such a sensor is provided in U.S. Pat. No. 6,386,053, incorporated herein by reference. Additional exemplary sensors useful for practice of the invention are disclosed in U.S. Pat. Nos. 5,714,059 and 5,053,344, and in "A magnetic sensor for predicting seafloor oxygen depletion," by Solan, M.; Kennedy, R.; Cure, M. S.; and Keegan, B. F.; (Benthos Research Group, Department of Zoology, Martin Ryan Marine Science Institute, National University of Ireland, Galway, Ire.), J. Mar. Environ. Eng. 5(3), 239–255, (1999), all of which are incorporated herein by reference.

The required threshold sensitivity of sensors of the invention will vary with different applications, collectors, collection zones, and similar design factors. It has been discovered that the combination of magnetically susceptible (or magnetic) materials and a magnetic collector allows for relatively high levels of sensitivity to be accomplished at a cost effective basis. In one exemplary invention embodiment, detection of a single magnetic particle that has penetrated a membrane is believed to be possible.

Sensing may be enhanced through marking of the magnetically susceptible or magnetic material. For example, the magnetically susceptible material may be tagged with a marker such as a fluorescent. Tagging can be accomplished by applying a coating to the material, and then exposing the coated material to a marking compound that is capable of binding to the coating. Any unbound marking compound may be removed by washing. An example of such a procedure using a fluorescent marking material is described in greater detail in the Zhang reference that has been incorporated herein by reference. A fluorescent detector could then be used, which may offer advantages of being relatively low in cost and high in sensitivity. Other tagging methods in addition to fluorescent will also be useful.

Still an additional aspect of the invention relates to attaching magnetically susceptible or magnetic particles to bacteria, viruses, or other microorganisms that may be pre-existing or native to a fluid of interest. To accomplish this, the magnetically susceptible particle may be coated with an antibody that binds to an antigen on the bacteria. Such a procedure is disclosed in the Zhang reference. Another method for accomplishing this is to expose magnetically susceptible or magnetic material such as beads to a concentrated solution of bacterial culture to cause non-specific adsorption of bacteria to the beads. An example of such a procedure is disclosed in "Improvement of the Immunomagnetic Separation Method Selective for *E. Coli* O157 Strains," by T. Tooyasu Applied and environmental Microbiology, (January 1998), herein incorporated by reference.

It is intended that the specific embodiments and configurations herein disclosed are illustrative of the preferred and best modes for practicing the invention, and should not be interpreted as limitations on the scope of the invention as defined by the appended claims.

What is claimed is:

1. A method for testing membrane integrity for a membrane configured to screen a minimum size particle in a fluid, the method including the steps of:

adding a magnetically susceptible material to the fluid upstream of the membrane wherein said magnetically susceptible material will flow into contact with the membrane, said magnetically susceptible material selected to have a size at least as large as said minimum size; and applying a magnetic field downstream from the membrane to collect any of said magnetically susceptible material that has passed through the membrane and determining that the membrane has a defect when said magnetically susceptible material is collected.

2. A method for testing membrane integrity as defined by claim 1, said magnetically susceptible material being between about 0.1 micron and about 20 microns in size.

3. A method for testing membrane integrity as defined by claim 1, said magnetically susceptible material being between about 5 and about 20 microns in size.

4. A method for testing membrane integrity as defined by claim 1, said magnetically susceptible material being between about 0.01 and about 0.1 microns in size.

5. A method for testing membrane integrity as defined by claim 1, said magnetically susceptible material being between about 0.1 and about 5 microns in size.

6. A method for testing membrane integrity as defined by claim 1 wherein said magnetically susceptible material comprises a magnetic material.

7. A method for testing membrane integrity as defined by claim 1 and further including the step of inducing magnetism in said magnetically susceptible material.

8. A method for testing membrane integrity as defined by claim 1 wherein said magnetically susceptible material is metallic.

9. A method for testing membrane integrity as defined by claim 1 wherein said magnetically susceptible material is a superparamagnetic particle.

10. A method for testing membrane integrity as defined by claim 1, said magnetically susceptible material having a magnetic mass susceptibility of at least about $75\times10^{-6}$ $m^3/kg$.

11. A method for testing membrane integrity as defined by claim 1 wherein the membrane is for screening contaminants with a charge behavior, and wherein said magnetically susceptible material is selected to resemble said contaminant charge behavior.

12. A method for testing membrane integrity as defined by claim 1 wherein said magnetically susceptible material is a microorganism.

13. A method for testing membrane integrity as defined by claim 1 wherein said magnetically susceptible material is one of a bacteria or a virus.

14. A method for testing membrane integrity as defined by claim 1, and further comprising the step of attaching said magnetically susceptible material to a contaminant in the fluid.

15. A method for testing membrane integrity as defined by claim 1, wherein said magnetically susceptible material has a density below about 2 $gm/cm^3$.

16. A method for testing membrane integrity as defined by claim 1, wherein said applied magnetic field has a gradient of between about 5,000 to about 20,000 Tesla/m.

17. A method for testing membrane integrity as defined by claim 1 wherein said magnetic field is applied to a collection zone, the fluid having a residence time in said collection zone of at least about 1 sec.

18. A method for testing membrane integrity as defined by claim 1 wherein the fluid is flowing through a container and said magnetic field is applied to a collection zone that extends over an entire cross section of the fluid in the container.

19. A method for testing membrane integrity as defined by claim 1, and further including the step of using a sensor to detect said collected magnetically susceptible material.

20. A method for testing membrane integrity as defined by claim 19, wherein the step of using said sensor is performed on-line.

21. A method for testing membrane integrity as defined by claim 19 wherein said magnetically susceptible material is magnetic, and wherein said sensor detects said magnetically susceptible material by detecting the magnetic field of said magnetically susceptible material.

22. A method for testing membrane integrity as defined by claim 19 wherein said sensor is a giant magnetoresistance sensor.

23. A method for testing membrane integrity as defined by claim 19 wherein said sensor is a surface profiling sensor.

24. A method for testing membrane integrity as defined by claim 19 wherein said sensor is one of a light scattering sensor, a laser sensor, a piezoelectric sensor, a magnetic resonance imaging sensor, a nuclear magnetic resonance sensor, or a mass change sensor.

25. A method for testing a membrane as defined by claim 19 wherein the step of applying said magnetic field includes using a magnetic collector, and wherein said sensor is integral with said magnetic collector.

26. A method for testing a membrane as defined by claim 1 wherein the method further includes the step of tagging said magnetically susceptible material with a marker.

27. A method for testing a membrane as defined by claim 26 wherein said marker comprises a fluorescent, and wherein the method further includes the step of detecting said collected material using a fluorescent detector.

28. A method for testing membrane integrity as defined by claim 1 wherein the step of applying a magnetic field to collect said magnetically susceptible material includes using a plurality of individual magnetic collectors.

29. A method for testing membrane integrity as defined by claim 28 wherein said plurality of individual magnetic collectors is arranged in a matrix.

30. A method for testing membrane integrity as defined by claim 28 wherein said plurality of magnetic collectors form a plurality of individual collection zones.

31. A method for testing membrane integrity as defined by claim 1 wherein the step of applying a magnetic field to collect said magnetically susceptible material includes the step of causing the fluid to flow through a magnetic collector.

32. A method for testing membrane integrity as defined by claim 31 wherein said magnetic collector comprises a magnetic filter.

33. A method for testing membrane integrity as defined by claim 1 wherein the step of applying a magnetic field to collect said magnetically susceptible material includes applying said magnetic field to define a collection zone configured to divert the flow path of said magnetically susceptible material and to thereby cause said magnetically susceptible material to flow into at least one sensing channel downstream from said collection zone, only a portion of said fluid flowing through said sensing channel.

34. A method for testing membrane integrity as defined by claim 33 wherein the method further includes the step of detecting said magnetically susceptible material in said at least one sensing channel using a sensor.

35. A method for testing membrane integrity as defined by claim 33 wherein the fluid is flowing through a container having a cross section, the fluid flowing across substantially all of said cross section, and wherein said at least one sensing channel extends over only a portion of said cross section.

36. A method as defined by claim 33 wherein a first quantity of fluid flows through the membrane, and wherein a smaller second quantity of fluid flows through said at least one sensing channel.

37. A method for testing membrane integrity as defined by claim 1 wherein the step of applying a magnetic field to collect said magnetically susceptible material includes retaining said magnetically susceptible material with a magnetic collector.

38. A method for testing membrane integrity as defined by claim 1 wherein the membrane is in a first channel, and wherein the method further includes the step of applying said magnetic field at a location downstream of said membrane in a second channel smaller than said first channel.

39. A method as defined by claim 1 wherein the step of adding a magnetically susceptible material to the fluid comprises adding a first portion of said magnetically susceptible material to the fluid, wherein a smaller second portion passes through a defect in the membrane, and wherein the step of applying a magnetic field to collect any of said magnetically susceptible material comprises applying a magnetic field to collect said second portion of said magnetically susceptible material.

40. A method for testing membrane integrity as defined by claim 1 wherein the step of applying a magnetic field to collect any of said magnetically susceptible material comprises applying a magnetic field to define a collection zone, and wherein the method further includes the step of using a sensor to detect said magnetically susceptible material while resident in said collection zone.

41. A method for testing the integrity of a membrane in a continuous flowing fluid, the membrane having a minimum screening size, the method including the steps of:

selecting a magnetically susceptible material having a size at least as large as the minimum screening size;

providing a membrane in a flowing fluid, said membrane having a defect;

placing said magnetically susceptible material into said fluid upstream of the membrane, a first portion of said magnetically susceptible material being retained by said membrane and a second portion of said magnetically susceptible material penetrating said membrane by passing through said defect;

inducing a magnetic response in said magnetically susceptible material;

using a magnetic collector to apply a magnetic field to a collection zone in the fluid downstream of said membrane to collect said second portion of said magnetically susceptible material that has penetrated said membrane, the fluid having a residence time in said magnetic field of at least about 1 sec;

using a sensor proximate to said collection zone to detect said second portion of said magnetically susceptible material while resident in said collection zone, said sensor operable to detect said second portion of said magnetically susceptible material by sensing the magnetic field of said second portion of said material; and, identifying said defect based on said detecting of said second portion of said magnetically susceptible material.

42. A method for testing membrane integrity for a membrane configured to screen a minimum size particle in a fluid, the method including the steps of:

selecting a magnetically susceptible material that has a size at least as large as the minimum size;

adding said magnetically susceptible material to said fluid upstream of the membrane;

applying a magnetic field downstream from the membrane to define a collection zone for collecting any of said magnetically susceptible material that has passed through the membrane;

using a sensor to detect any of said magnetically susceptible material while resident in said collection zone; and, determining that the membrane has a defect if said sensor detects any of said magnetically susceptible material in said collection zone.

* * * * *